March 19, 1935.   A. H. R. FEDDEN ET AL   1,995,244
SLEEVE VALVE CYLINDER
Filed Aug. 27, 1934
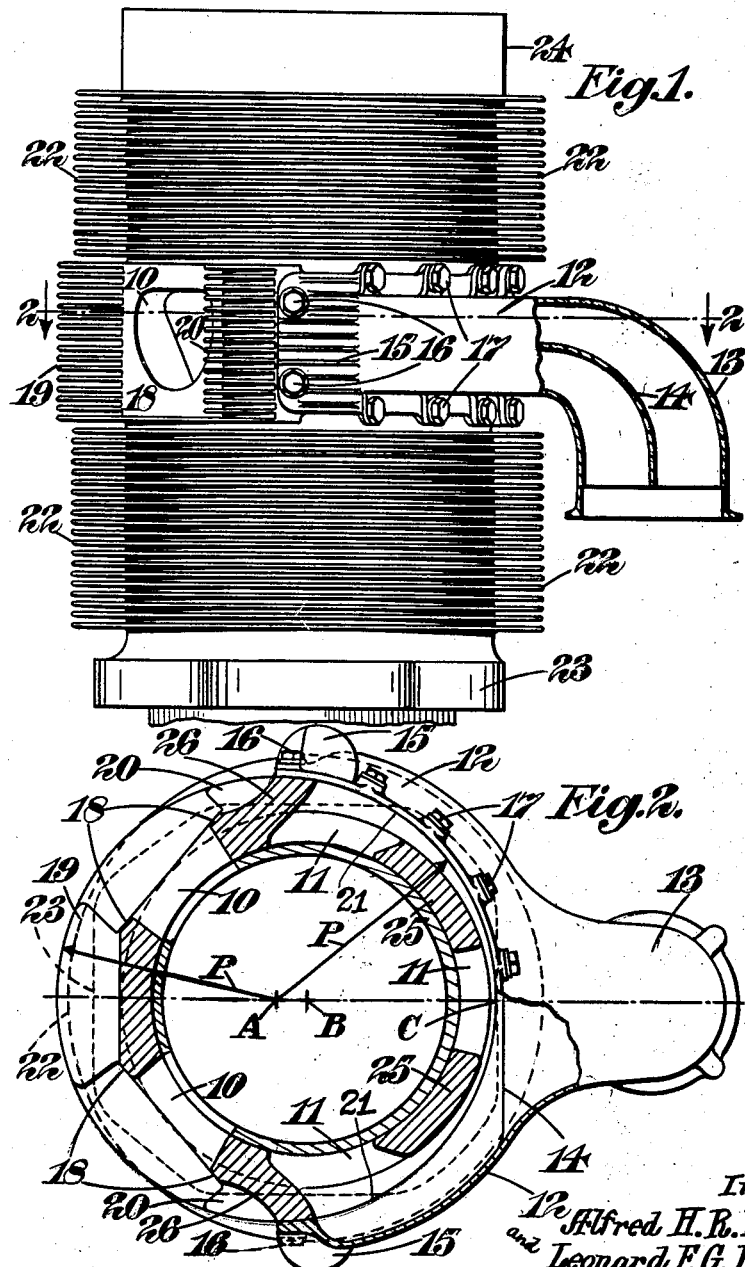

Patented Mar. 19, 1935

1,995,244

UNITED STATES PATENT OFFICE 1,995,244

SLEEVE-VALVE CYLINDER

Alfred Hubert Roy Fedden and Leonard Frederick George Butler, Bristol, England, assignors to The Bristol Aeroplane Company Limited, Bristol, England, a British company Application August 27, 1934, Serial No. 741,662
In Great Britain September 8, 1933

4 Claims. (Cl. 123—75)

This invention is for improvements in or relating to the cylinders of sleeve-valve internal-combustion or other engines or pumps in which ports in a cylinder wall are opened and closed by a reciprocating and/or rotating sleeve and is concerned with that type of cylinder in which a group of ports is arranged around part of the circumference of the cylinder and a fluid conduit in the form of a part of a ring, termed a "belt", and is affixed to the outside wall of the cylinder to conduct fluid to or from the said ports. There are usually two groups of such ports, one group for inlet and the other for exhaust and one or both of the groups is covered by an induction belt or an exhaust belt respectively.

Where a single group of ports extends over more than 180° of the cylinder-circumference, it has hitherto been necessary to machine the belt-seating on the cylinder wall, and the belt itself, with flat surfaces at the ends of the belt; otherwise the belt cannot be fitted into position unless it is formed in two separate portions.

According to the present invention, the cylinder seating for the belt is machined eccentrically from and to a larger diameter than the outside diameter of the cylinder, for the purpose of reducing the angular extent of the seating and of the belt, without unduly increasing the bulk of the cylinder. For example, where the group of ports concerned has an angular extent of about 220°, by machining the belt seating to a somewhat larger diameter at a centre displaced from the cylinder axis away from the said ports, the angular extent of the said belt seating can be reduced to somewhat less than 180° whereby the belt, and the belt seating, may each be machined in a single turning operation.

The portions of the cylinder between the said ports may be machined down to the normal cylinder thickness in order to increase the effective cross-section of the belt, and in order to save weight.

In an air-cooled sleeve-valve internal-combustion engine in which a group of inlet ports extends round one side of the cylinder and a group of exhaust ports is situated at the opposite side of the cylinder, and the seating for the inlet belt is machined eccentrically as above described, the edges of the cooling vanes for the exhaust ports may be machined in the same operation. The exhaust-port walls are the hottest parts of the cylinder and it is therefore desirable that the cooling vanes in this region should be somewhat larger than elsewhere and the present invention provides a simple means for effecting such enlargement.

A specific embodiment of the present invention will now be described, by way of example, with reference to the accompanying drawing, of which—

Figure 1 is an elevation of one cylinder of a sleeve-valve, air-cooled, internal-combustion engine for aircraft, and Figure 2 is a plan corresponding to Figure 1, being partly a section on the line 2—2 of Figure 1 and partly an outside view.

Referring first to Figure 2, there are two exhaust ports 10 and three inlet ports 11 and the inlet ports 11 are engaged by a belt 12 which is channel-shaped in section and which is formed integrally with an elbow 13 (see also Figure 1) leading from a supercharger, a carburetter or, in the case of a compression-ignition engine, simply from an air intake. The elbow 13 has a partition 14 within it which serves to distribute the air or mixture more uniformly.

The ends of the belt 12 are formed with cooling fins 15 and the belt is attached to the cylinder by bolts 16 and 17. At the region of each exhaust port 10 the cylinder is formed with a flat facing 18 to which an exhaust pipe (not shown) is attached and the region between the two exhaust ports 10 is occupied by cooling fins 19 and the region between each exhaust port 10 and the adjacent inlet port 11 is furnished with additional cooling fins 20.

The cylinder barrel is manufactured as follows:— It is first machined about a centre A with a radius P, at its central part, to define the outer edge of the exhaust fins 19 and to form a seating 21 on the cylinder barrel for the exhaust belt. The centre A is eccentric from the cylinder axis B and the radius P is larger than the external radius of the cylinder barrel, for reasons which are explained below. The ordinary concentric cooling fins 22 are now machined and, as is seen from Figure 1, these fins occupy the regions above and below the region of the ports. The cutting of the individual fins is, of course, a separate operation and forms no part of the present invention. Similarly, the bottom of the cylinder barrel is formed with an octagonal portion 23 by which it is bolted to the crankcase and the top of the cylinder barrel 24 is machined to receive within it a recessed cylinder-head (not shown).

It will be seen that the portions of the cylinder barrel 25 which lie between each adjacent pair of inlet ports 11 originally extend outwardly as far as the eccentric machined face 21 but the outer wall of these portions is subsequently machined down concentrically with the cylinder bore to form portions which have, as shown, a uniform thickness equal to that of the remainder of the cylinder barrel. In this way unnecessary metal is removed and the effective cross-sectional area of the induction belt at these points is increased.

It will be seen that the total circumferential extent of the inlet ports 11 is slightly greater than 180° so that it would be impossible to use the ordinary external surface of the cylinder barrel as a seating for the induction belt 13 without forming the induction belt in two portions, since it would be impossible to bring the induction belt into position. However, by machining the induction belt seating about the enlarged radius P, the angular extent of the induction belt is reduced to something slightly less than 180°, so that it can be fitted into position seating. The outer edges of the two outside inlet ports 11 are sloped towards the induction belt as shown and this feature aids the design of the induction belt.

In order that the webs of metal 26 between the ports 10 and the adjacent ports 11 shall not be unduly large, the centre A about which the induction belt seating is machined, is displaced away from the induction belt so that at the point C (Figure 2) the induction belt seating is approximately tangential to the ordinary outer surface of the cylinder barrel.

It will be seen that, by machining the exhaust fins 19 in the same operation as the induction belt seating 21, the exhaust fins become larger, radially of the cylinder, than the ordinary concentric fins 22. This enlargement is desirable since the region of the exhaust ports is the hottest part of the cylinder. The dissipation of heat from this region is assisted by the fins 15 formed on the ends of the induction belt 12.

It will be understood that the invention is not limited, in its application, to the particular type of engine described but could also be applied to the cylinder of any other sleeve-valve engine or pump in which a fluid belt is used. In the example of the invention described with reference to the drawing, the exhaust ports 18 could, of course, be fitted with an exhaust belt instead of individual exhaust pipes.

We claim:—

1. A cylinder for a sleeve valve engine or pump having a fluid-belt co-operating with a group of ports in the cylinder wherein the seating for the belt on the cylinder is machined to a larger diameter than the outside walls of the cylinder and about a centre displaced in a direction away from the said ports.

2. A cylinder for an air-cooled sleeve valve internal combustion engine, having an inlet-belt co-operating with a group of inlet ports in the cylinder, the exhaust ports being disposed in the opposite wall of the cylinder, wherein the seating for the belt on the cylinder is machined to a larger diameter than the outside walls of the cylinder and about a centre displaced in a direction away from said ports, and wherein the outer edges of cooling fins for the exhaust ports are machined about the same centre, and to the same diameter, as said inlet-belt seating.

3. A cylinder for an air-cooled sleeve valve internal combustion engine having an inlet-belt co-operating with a group of inlet ports in the cylinder, wherein the seating for the belt on the cylinder is machined to a larger diameter than the outside walls of the cylinder and about a centre displaced in a direction away from said ports, and wherein the ends of the inlet-belt in the neighbourhood of the exhaust ports are provided with cooling fins.

4. A cylinder for a sleeve valve engine or pump having a group of ports the total angular extent of which is greater than 180° and a fluid-belt co-operating with the said group of ports, wherein the seating for the belt on the cylinder is machined to a larger diameter than the outside walls of the cylinder and about a centre displaced in a direction away from said ports.

ALFRED HUBERT ROY FEDDEN.
LEONARD FREDERICK GEORGE BUTLER.